No. 740,241. PATENTED SEPT. 29, 1903.
C. H. COOMBS.
WIRE BENDING MACHINE.
APPLICATION FILED APR. 1, 1902.
NO MODEL. 6 SHEETS—SHEET 1.

FIG. I.

WITNESSES:
Herbert Bradley
Fred Kirchner

INVENTOR
Charles H. Coombs
by Dennis S. Wolcott Att'y.

No. 740,241. PATENTED SEPT. 29, 1903.
C. H. COOMBS.
WIRE BENDING MACHINE.
APPLICATION FILED APR. 1, 1902.
NO MODEL. 6 SHEETS—SHEET 2.

WITNESSES:
Herbert Bradley.
Fred Kirchner

INVENTOR
Charles H. Coombs
by Darwin S. Wolcott Att'y.

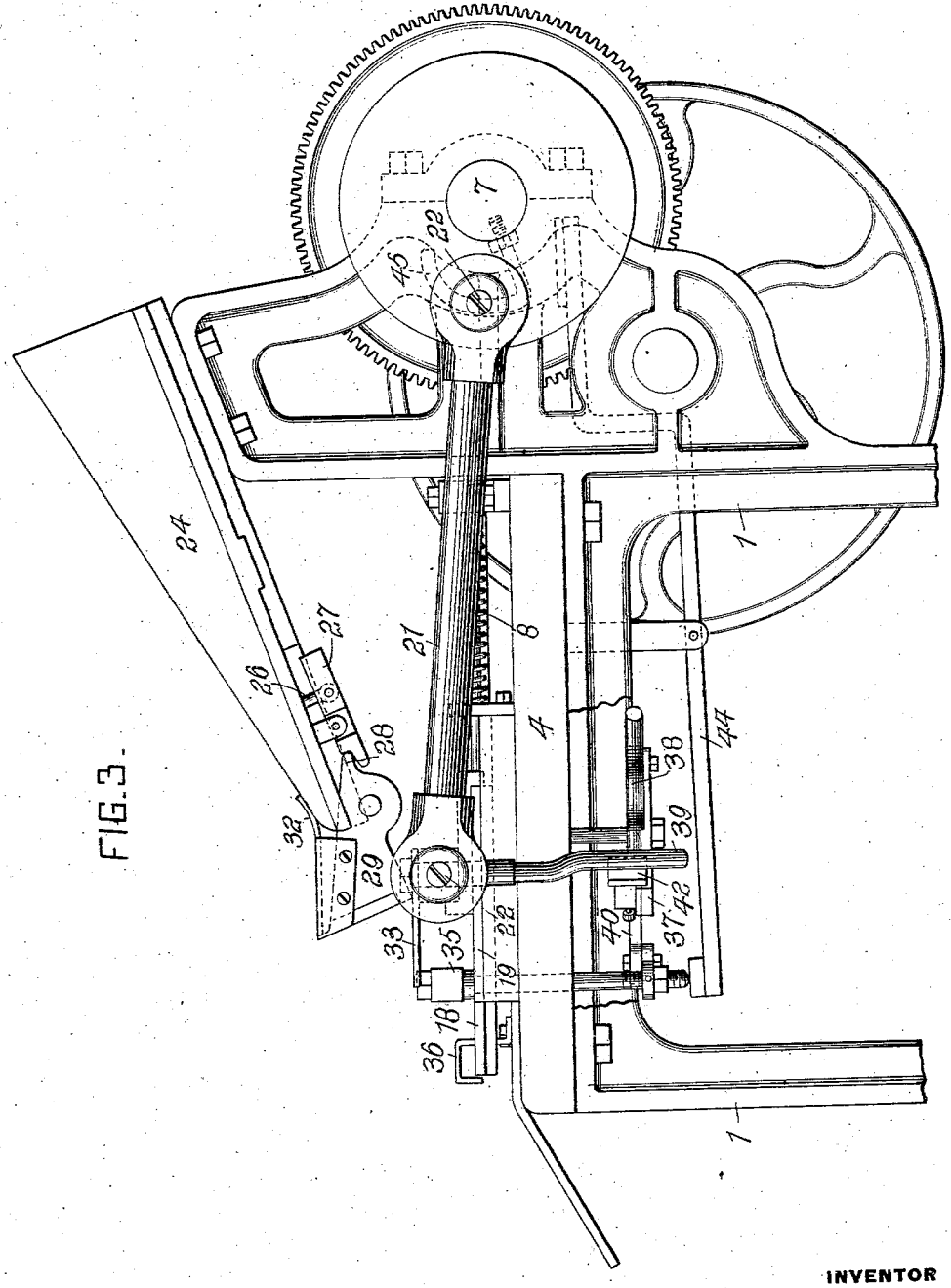

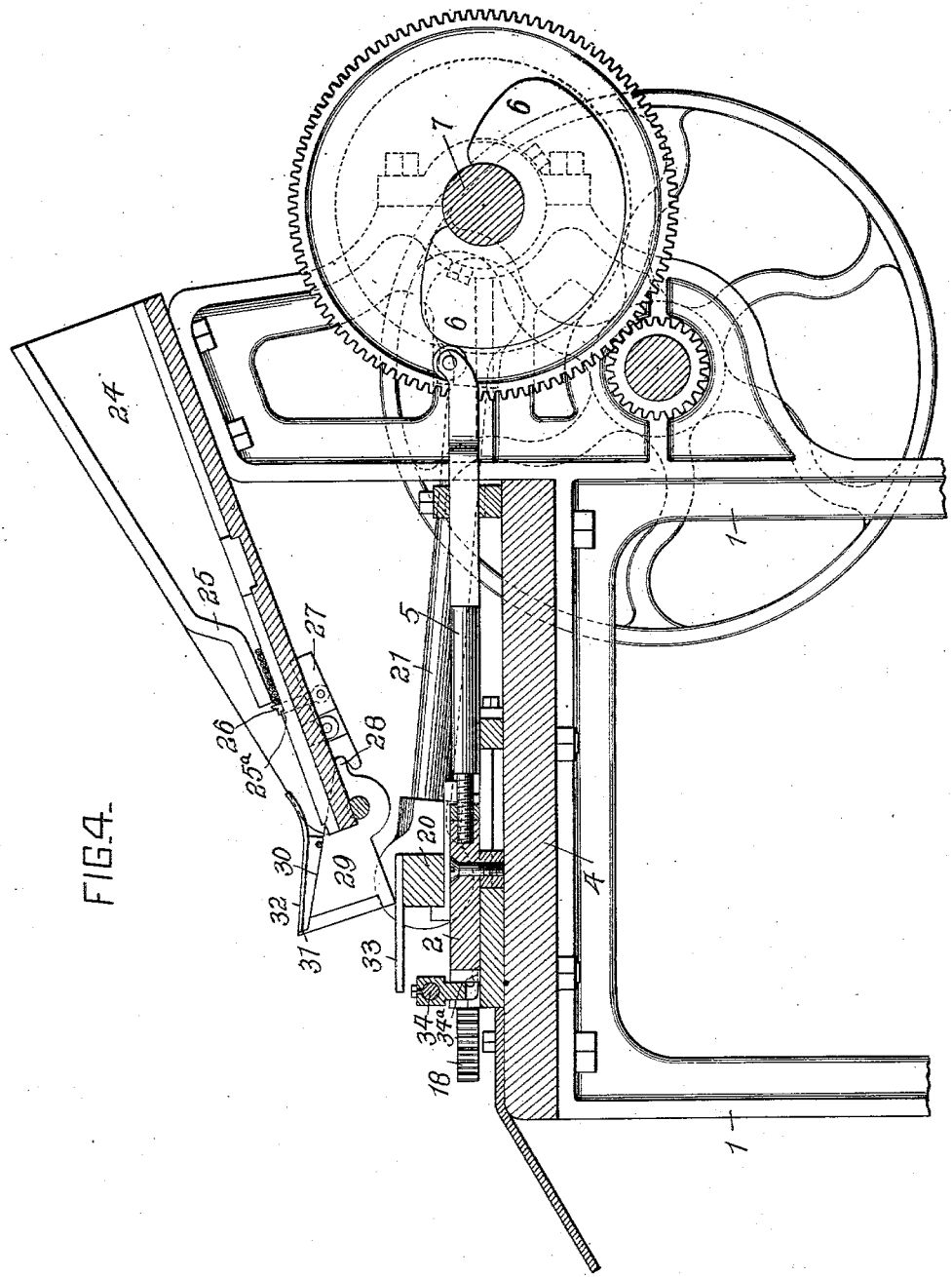

No. 740,241. PATENTED SEPT. 29, 1903.
C. H. COOMBS.
WIRE BENDING MACHINE.
APPLICATION FILED APR. 1, 1902.
NO MODEL. 6 SHEETS—SHEET 5.
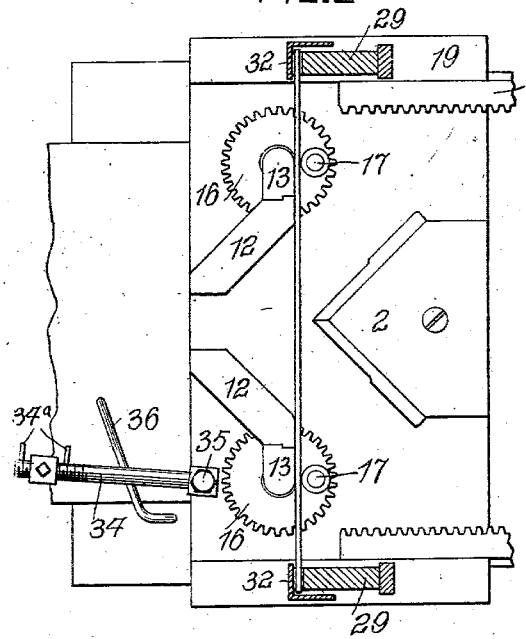
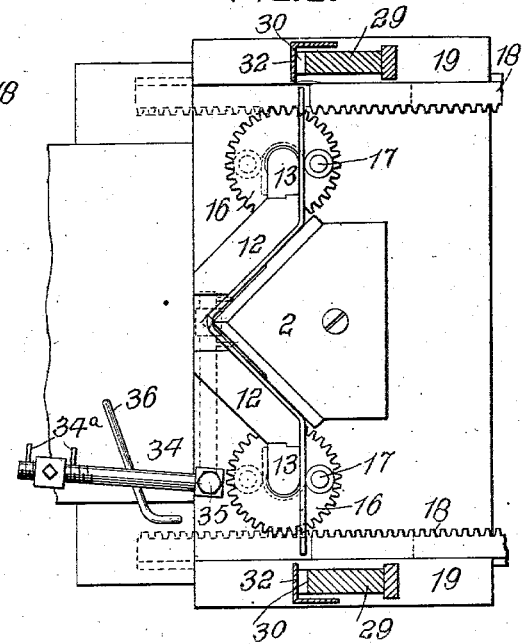
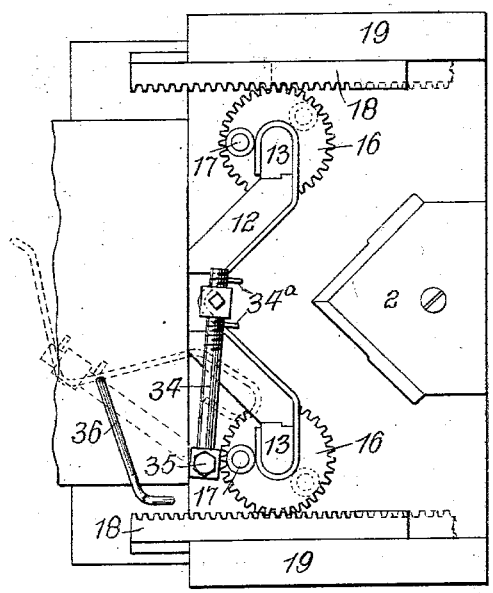
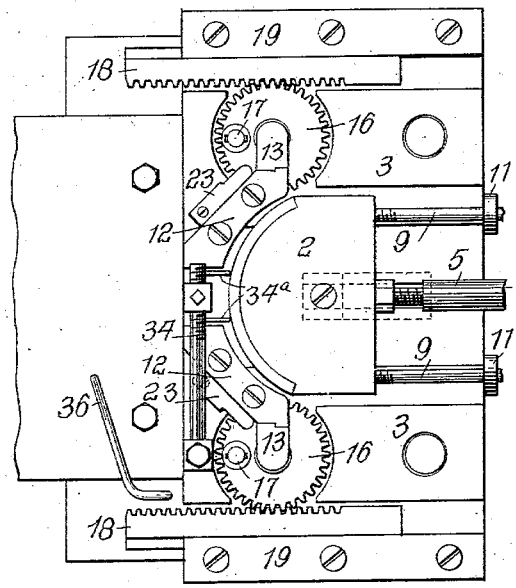
WITNESSES:
Herbert Bradley.
Fred Kirchner.
INVENTOR
Charles H. Coombs
by Samuel S. Wolcott Att'y.

No. 740,241. PATENTED SEPT. 29, 1903.
C. H. COOMBS.
WIRE BENDING MACHINE.
APPLICATION FILED APR. 1, 1902.
NO MODEL. 6 SHEETS—SHEET 6.
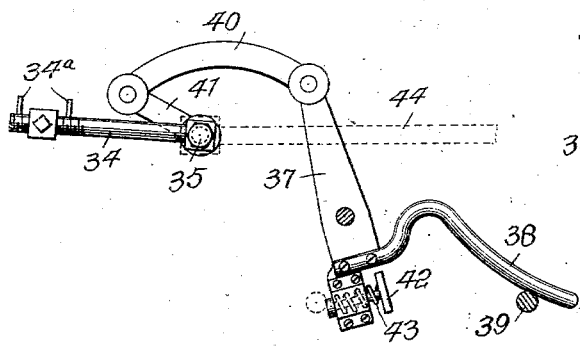
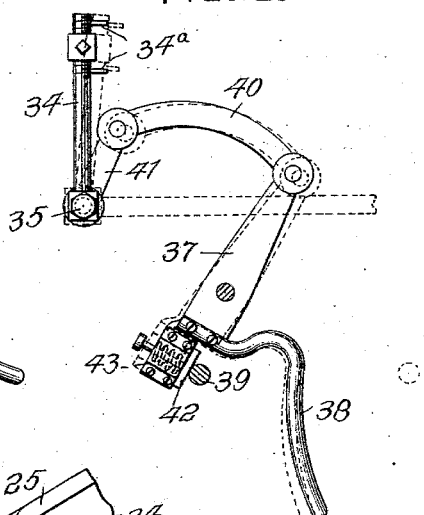
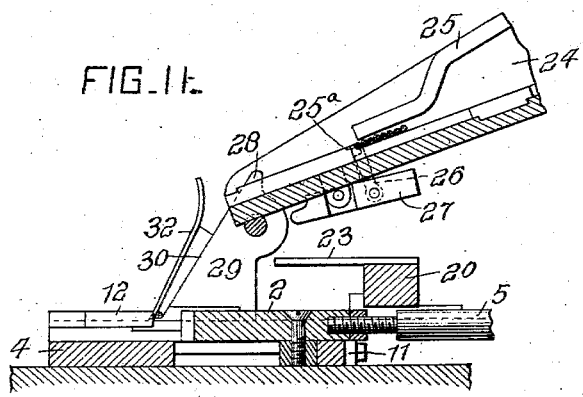
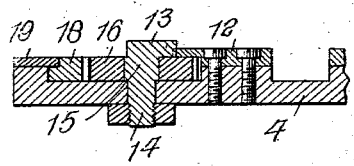
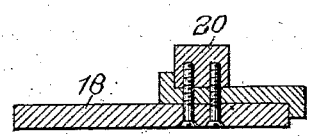
WITNESSES: INVENTOR
Herbert Bradley Charles H. Coombs
Fred Kirchner by Dennis S. Wolcott Att'y No. 740,241.

Patented September 29, 1903.

UNITED STATES PATENT OFFICE.

CHARLES H. COOMBS, OF ALLEGHENY, PENNSYLVANIA, ASSIGNOR, BY MESNE ASSIGNMENTS, TO THE WILLIAMSPORT MIRROR & GLASS COMPANY, OF WILLIAMSPORT, PENNSYLVANIA.

WIRE-BENDING MACHINE.

SPECIFICATION forming part of Letters Patent No. 740,241, dated September 29, 1903.

Application filed April 1, 1902. Serial No. 100,898. (No model.)

*To all whom it may concern:*

Be it known that I, CHARLES H. COOMBS, a citizen of the United States, residing at Allegheny, in the county of Allegheny and State of Pennsylvania, have invented or discovered certain new and useful Improvements in Wire-Bending Machines, of which improvements the following is a specification.

The invention described herein relates to certain improvements in wire-bending mechanism, such mechanism being especially adapted for bending wires to form back frames or supports for mirrors, although by slight changes or modifications as are within the knowledge of the skilled mechanic the bending mechanism can be adapted to form articles of other shapes or contours.

The invention is hereinafter more fully described and claimed.

Figure 1:
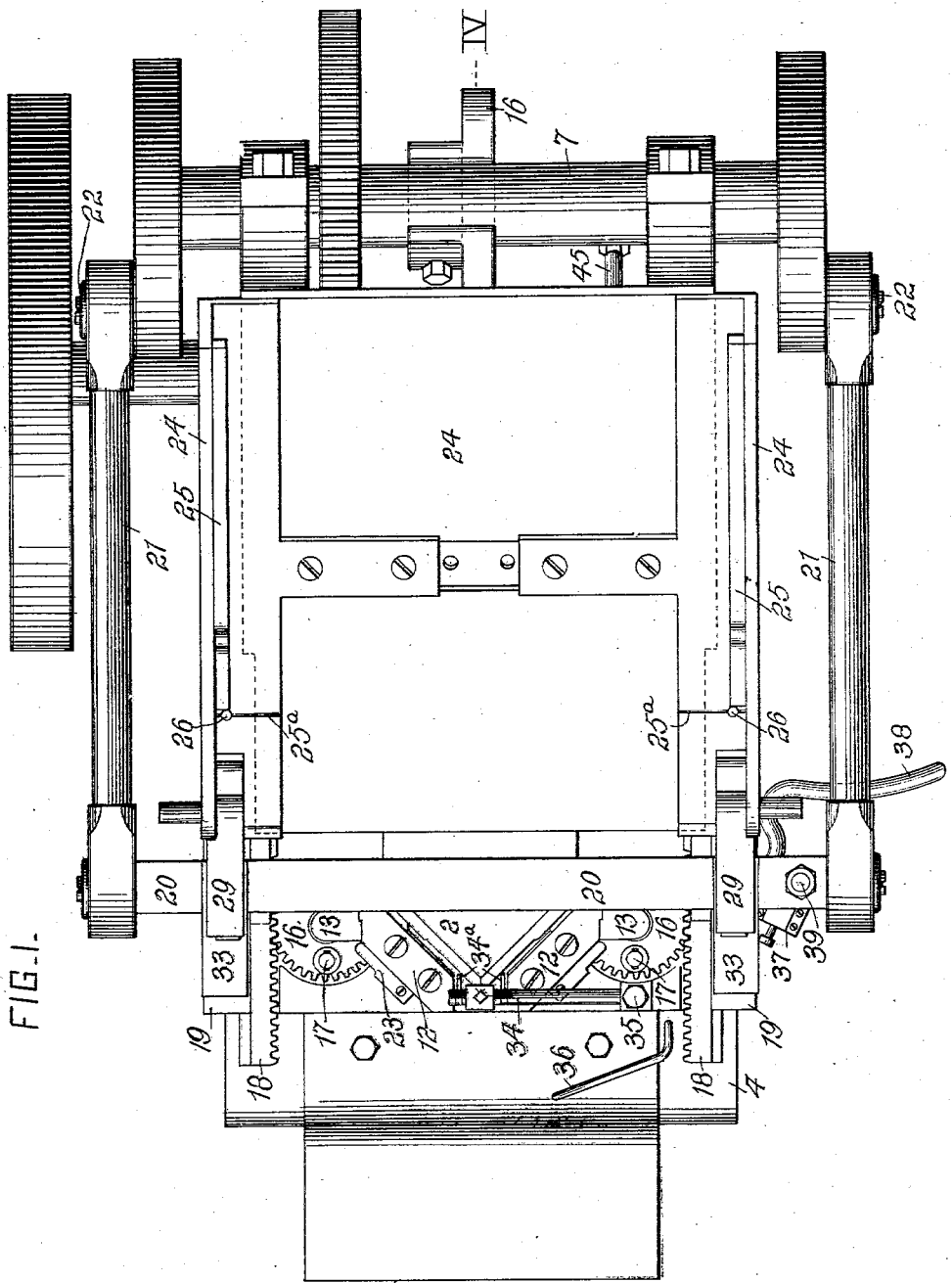
Figure 2:
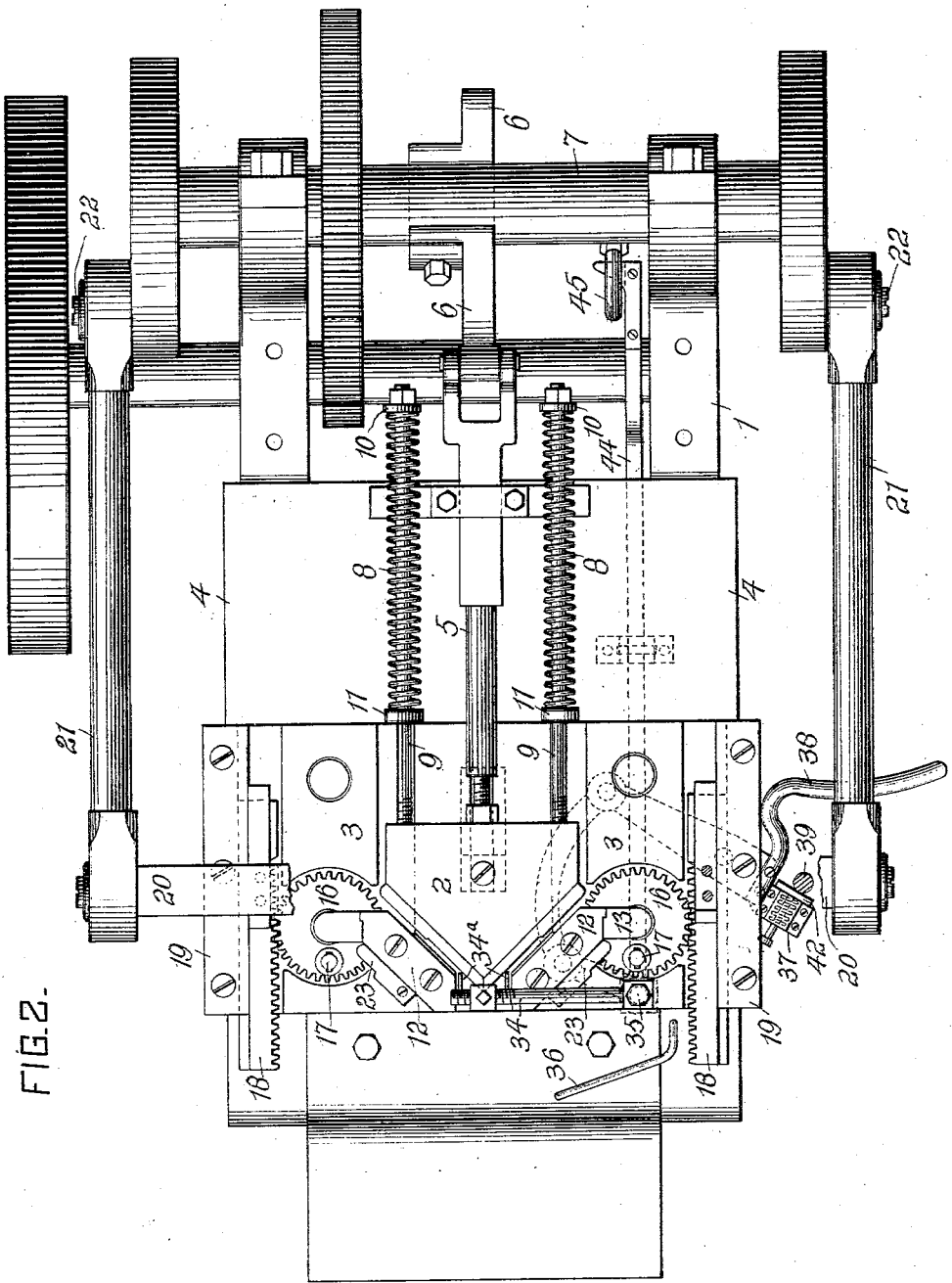

In the accompanying drawings, forming a part of this specification, Figure 1 is a top plan view of my improved bending mechanism. Fig. 2 is a similar view, the wire-feeding mechanism being removed. Fig. 3 is a side elevation of the machine. Fig. 4 is a sectional elevation on a plane indicated by the line IV IV, Fig. 1. Figs. 5, 6, and 7 are diagrammatic views showing the position of the parts directly involved in the bending of the wire at various stages of the operation. Fig. 8 is a view similar to Fig. 7, showing a modification of some of the bending devices. Figs. 9 and 10 are detail views illustrating the mechanism for removing the finished article in different positions. Fig. 11 is a sectional detail view illustrating the mechanism for feeding the wire to the bending devices, and Figs. 12 and 13 are sectional views illustrating details of construction.

In the practice of my invention the wire-bending mechanism and their operating devices are mounted upon a suitable frame or support 1. The movable bending-die 2, which may have its operative face of any desired contour—as, for example, V-shaped, as shown in Figs. 2, 5, 6, and 7, or rounded, as shown in Fig. 8—is arranged to reciprocate back and forth between guides 3, mounted on the bed-plate 4. This bending-die 2 is adjustably connected to a rod 5, adapted to be shifted in one direction by a cam 6, mounted upon the power-shaft 7, and in the opposite direction by springs 8, surrounding rods 9, connected to the die and bearing at one end against shoulders or abutments 10 on the rods and at the opposite ends against shoulders or abutments 11, secured to the bed 4. The forming-blocks 12, which coöperate with the operative faces of the die 2 to form the initial bend, are detachably secured to the bed 4, as clearly shown in Fig. 2, and have their inner or operative faces to correspond in contour with the operative faces of the bending-die 2. Auxiliary formers 13 are arranged at the outer ends of the main formers 12, said auxiliary portions being formed on the upper ends of pins 14, which extend down through the bed-plate 4 and are secured in position by nuts or other suitable means. The pins 14 have circular bearing portions 15 immediately under the portions 13, such bearing portions forming the journals of disks 16, as shown in Fig. 12. These disks are provided on their upper surfaces with projections 17, preferably having friction-rolls mounted thereon and arranged in such relation to the auxiliary formers 13 that when carried around the formers 13 by the rotation of the disks will bend the end portions of wires around said formers, as clearly shown in Figs. 6 and 7. Any suitable form of construction of mechanism may be employed for operating the disks—such, for example, as that shown, consisting of a series of teeth formed on the peripheries of the disks and a toothed bar 18, adapted to be reciprocated back and forth in guides 19 and by engagement with the teeth on the disks impart to the same the desired rotation. These rack-bars are secured to a cross-head 20, having its ends connected by pitmen 21 to crank-pins 22, carried by the power-shaft 7. The mechanism—*i. e.*, the cam 6—for reciprocating the main bending-die 2 and the crank-pins for reciprocating the rack-bars and disks 16 are so timed as regards their operation that the rack-bars will not impart a movement to the disks until the preliminary bend has been imparted to the wire and the latter held and clamped firmly in position between the die 2 and formers 12, as shown in Fig. 6. After this preliminary bend has been imparted to the wire the disks are rotated, carrying the projections 17 around the auxiliary formers, and thereby bending the ends of the wire to the shape or contour of the formers. In order to prevent any shifting of the former during the bending of the ends, the inner ends of the auxiliary formers are interlocked, as clearly shown in Fig. 2, with the ends of the formers 12 as against any shifting by the projections 17 when effecting the bending of the ends. In order to prevent any other movement of the disks 16, especially when returning to normal position, springs 23 are so secured to the bed 4 that their free ends will bear upon the disks and prevent such excess of movement.

In order to feed the wires, which are cut to suitable lengths, into the machine, I provide a trough 24, having upwardly-projecting sides provided with ledges 25, under which the wires pass down to movable pins 26, arranged adjacent to opposite sides of the trough. These pins are connected to levers 27, pivoted to the under sides of the trough and having their opposite ends in engagement with projections 28 on rocking heads 29, which are pivotally mounted at the lower end of the trough. These heads are provided on their inner surfaces with supporting-ledges 30, so formed that when the heads are raised to the position shown in Fig. 4 the ledges will have an upward slope along which the wires will roll when released by the pins 26, as hereinafter described. A stop or abutment 31 is formed at the lower ends of the ledges 30 to prevent the wire from passing off the same when the heads are turned down. Flanges 32 are arranged in suitable relation to the ledges to hold the wires within the heads. On the cross-head 20 are secured arms 33, projecting forwardly and adapted when said cross-head moves forward to lift the heads 29 to the position shown in Fig. 4 and to permit when the cross-head returns to rearward position the heads 29 to drop to feeding position, as shown in Fig. 11. The heads 29 are so constructed and connected to the trough that when dropped to the position shown in Fig. 11 the wire carried on the ledges and resting against the stop or abutment 31 in such position of the heads will be directly between the die 2 and the main formers and between the projections 17 and the auxiliary formers, as shown in Fig. 5. As the main die moves forward, bending the middle portion of the wire, the ends of the wire are drawn out from behind the flanges 32, so that when the disks are rotated the ends will pass free of such flanges and can be bent around the auxiliary formers. When the heads 29 drop, as described, to place a wire in position to be bent, the outer or weighted end of the levers 27 will drop, drawing down the pins 26, so that a wire will roll forward against stops 25$^a$ and be immediately in position above the pins 26, whose upper ends are preferably inclined, as shown. When the heads 29 are lifted by the advance of the cross-heads 20, the projection 28 on the heads will raise the pins 26, thereby lifting the wire from behind the stop 25$^a$ and permitting it to roll down the ledge and the sides of the trough onto the ledge 30 of the heads, where it will remain until the heads drop on the rearward movement of the cross-head, so as to deposit a wire in proper position as regards the bending devices.

In order to remove the bent wire from the machine, I employ an arm 34, secured to the upper end of a vertical shaft 35, which is adapted to be rotated to swing the arm 34 from the position shown in Fig. 1 to a position to engage the finished wire at the end of the bending operation. The arm 34 is provided at its upper or free end with fingers 34$^a$, adapted to engage the completed article and lift it away from the formers and carry it to a position over a suitable receptacle, where it will be freed from the fingers by a suitable knocker 36. The movement of the arm and its supporting-shaft 35 is effected by any suitable form or construction of mechanism—such, for example, as that shown consisting of a lever 37, pivotally mounted on the under side of the frame of the machine and provided at one end with a curved arm 38, adapted to be engaged by a finger 39, extending down from the cross-head 20, as clearly shown in Figs. 1, 3, 9, and 10. The opposite end of the lever 37 is connected by a link 40 to an arm 41, secured to the lower end of the vertical shaft 35. As the cross-head moves to the rear the finger 39 will strike the arm 38, and thereby shift the lever 37, so that the arm 34 will be moved to a position away from the bending mechanism, as shown in Figs. 5 and 6. When the cross-head moves forward, the finger will strike against a spring-abutment 42 on the lever, and thereby shift said lever and the arm 34 to a position against the front end of the die 2, as shown in Figs. 7, 8, and 9, the fingers 34$^a$ on the arm 34 passing under the wire. By this movement of the finger 39 the spring 43 is compressed, the abutment 42 being forced against the outer end of the lever. This movement of the arm 34 occurs just as the cross-head reaches the forward limit of its movement and just before the die 2 begins to retreat. As the die 2 moves backward the spring 43 will expand, causing the arm 34 and fingers 34$^a$ to move forward slightly, so that the fingers will pass fully under the bent wire. The arm and fingers will remain in this position until the cross-head approaches the rearward limit of its movement, or until such time as the disks 16 have been so shifted by the rack-bar as to bring the projections 17 to normal position, whereupon the finger 39 will strike the arm 38, so as to swing the arm 34, and with it the bent wire, away from the bending mechanism; but prior to this outward movement of the arm 34 it must be given a slight vertical movement, so that the portions of the wire bent around the auxiliary formers 13 may be stripped therefrom. This vertical movement is imparted by a lever 44, bearing at one end against the lower end of the vertical shaft 35, while its opposite end is adapted to be shifted to raise the shaft 35 by means of a cam 45 on the power-shaft 7, as shown in Figs. 1 and 2.

As the die 2 and the formers 12 and auxiliary formers 13 are made removable from the machine, it will be readily understood that by employing dies and formers of different shape or contour from those shown other shapes or constructions of wires can be formed in my improved machine. As such other forms may require longer or shorter lengths of wire, the sides of the feed-trough are made adjustable toward and from each other, as clearly shown, and by employing different sizes of cam 6 on the power-shaft any desired length of throw for the die 2 can be had.

I claim herein as my invention—

1. A machine for bending wire having in combination bending mechanism, and mechanism for feeding lengths of wire to the bending mechanism and operative by a portion of the bending mechanism, substantially as set forth.

2. A machine for bending wire having in combination bending mechanism, a feed-trough, placing-heads and means for shifting lengths of wire one at a time from the trough to the placing-heads, substantially as set forth.

3. A machine for bending wire having in combination bending mechanism, a feed-trough, placing-heads pivotally connected to the trough, lifting-pins operative by the heads, the vertical movements of the heads being controlled by the bending mechanism, substantially as set forth.

4. A machine for bending wire having in combination bending mechanism, a swinging arm provided with fingers adapted to engage the finished article and means for shifting said arm to and from the bending mechanism, substantially as set forth.

5. A machine for bending wire having in combination bending mechanism, a swinging arm provided with fingers adapted to engage the finished article, means for shifting said arm toward and from the bending mechanism, and means for shifting the arm vertically, substantially as set forth.

6. A machine for bending wire having in combination bending mechanism, an arm provided with fingers adapted to engage the finished article, a lever connected to said arm, a finger carried by the bending mechanism and a resilient cushioned on the lever and forming a bearing-point for the finger, substantially as set forth.

7. A machine for bending wire having in combination bending mechanism, an arm provided with fingers adapted to engage the finished article, a lever connected to said swinging arm and provided with a lateral extension or arm, and a finger carried by the bending mechanism and adapted to engage the lever and its lateral extension, substantially as set forth.

In testimony whereof I have hereunto set my hand.

CHARLES H. COOMBS.

Witnesses:
F. E. GAITHER,
DARWIN S. WOLCOTT.